United States Patent Office 3,021,348
Patented Feb. 13, 1962

3,021,348
REMOVAL OF NITROGEN COMPOUNDS
Vincent P. Kuceski, Park Forest, Ill., assignor to The C. P. Hall Company, Akron, Ohio, a corporation of Ohio
No Drawing. Filed Aug. 24, 1954, Ser. No. 451,949
5 Claims. (Cl. 260—413)

This invention relates to the oxidation of saturated and unsaturated, cyclic and acyclic, aliphatic hydrocarbons and oxygenated derivatives thereof, by nitric acid, nitrous acid or an oxide of nitrogen higher than $N_2O$, and the production of carboxylic acids therefrom. More particularly, the invention relates to the removal of nitrogen compounds from the carboxylic acids formed in such oxidation reactions.

The starting material may be found in nature or may be made synthetically and must contain 4 or more adjacent methylene carbon atoms in a saturated chain. It may be fatty acid, such as red oil, stearic acid, or fatty acids from greases and tallows, or fatty acid of vegetable origin such as coconut fatty acid, cotton seed fatty acid and fatty acid from other seed oils, or fatty acids and rosin acids from tall oil. The starting material may be derived from petroleum materials or be synthesized as in the Fischer-Tropsch or Oxo reactions. For instance, it may be one or more of the alcohols, aldehydes, ketones, monocarboxylic acids, esters or others produced in such syntheses. Other materials such as paraffinic and olefinic hydrocarbons present in or derived from petroleum or obtained by the cracking of carbonaceous materials, etc. may be used. The oxidation of materials derived by the Oxo process and by the Fischer-Tropsch process is described in Hill U.S. 2,768,201. This process involves treating residues from such operations with nitric acid, with or without admixture with air, at elevated temperatures and superatmospheric pressures, and the production of carboxylic acids thereby. The oxidation of the other materials has been described in the literature.

In the oxidation, the nitric acid or other nitrogen-containing oxidizing agent may be used alone or in conjunction with air or oxygen. It may be preceded or followed by other oxidations such as ozonization, etc.

It has been found in the oxidation of these starting materials that nitro derivatives have been formed. The nitro group may add onto any one of various places in the chain. One or more carboxylic groups may be formed. The process has particular application to the treatment of the oxidation products derived from a fatty acid in which mono-and dicarboxylic acids are produced. During the oxidation of a fatty acid and the production of monocarboxylic acids of shorter chain length and dicarboxylic acids, objectionable side reactions occur in which primary and secondary nitro compounds are formed.

The object of the invention is to remove such nitro compounds, regardless of the starting material. Such reactions are preferably stopped short of complete conversion to carboxylic acids to minimize the extent of attack of the oxidizing agent on the carboxylic acids which have been formed. Thus a two-phase reaction product is obtained, the unreacted starting material being in the oil phase, and the aqueous nitric acid forming the other phase. The carboxylic acids which are formed distribute themselves between the two phases according to their solubilities in each phase. In carboxylic acids recovered by usual methods, some nitro compound is present as an impurity. According to this invention, the carboxylic acids which contain nitro impurity are converted to esters which are insoluble, or only slightly soluble in water. These esters are then washed with aqueous alkali metal base. The alkali metal base converts the nitro compound or compounds to a water-soluble derivative, according to the following equation:

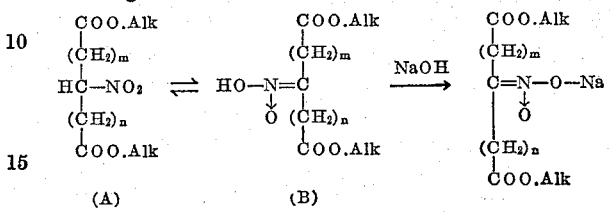

where $m$ and $n$ are each either zero or an integer.

The nitro compound isomerizes as shown by formulae (A) and (B), the amount of isomerization depending on the conditions, such as the acidity or alkalinity, temperature, and structure of the compound. The nitro compound (A) does not react as such with the alkali, but does as its aci-form (B) which contains the acidic hydrogen.

The above formulae are shown merely as an example of one type of derivative which is made and are not meant to limit the scope of the invention. Other starting materials form nitro compounds which would fall into the class of compounds represented by the following general formula.

The following formula is a more general formula which illustrates nitro compounds formed from other starting materials as well as those formed from fatty acids, and includes nitro compounds formed from branched chain starting materials as well as straight chain starting materials:

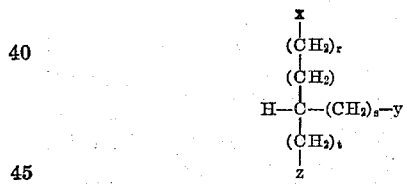

In the formula $r$, $s$ and $t$ may be zero or an integer. Also in the formula $x$, $y$ and $z$ may be —COOR, CRR′R″,—CHRR′, —H or —$NO_2$, in which R, R′ or R″ are the same or different alkyl groups, and such compounds may be removed by washing with an alkali metal base provided at least one of the groups represented by $x$, $y$ and $z$ is nitro. Compounds in which the nitro group is attached to a tertiary carbon do not isomerize, and therefore are not converted to soluble sodium derivatives, as indicated above, and are not removed as herein contemplated.

The nitro compounds which are formed depend upon the starting material and the conditions of the reaction. If the starting material contains hydrocarbon, the nitro group may add to the hydrocarbon chain without conversion of any carbon of the chain to a carboxylic group.

The nitro compounds are objectionable for various reasons and principally because they are unstable. If an ester containing one or more such nitro compounds is subjected to distillation, the nitro compounds are apt to decompose during the distillation and not only discolor the distillate but catalyze decomposition of the desired ester products, resulting in a lower percent yield than is obtained if the nitro compounds are first removed. Furthermore, such decomposition occurs on aging under certain conditions and if, for example, the ester is used as a plasticizer the decomposition which occurs during the normal life of the plasticized material will cause discoloration thereof or other undesirable reactions. The rate of decomposition depends upon the temperature to which the material is subjected and other outside catalyzing influences.

The following example is illustrative of the removal of the nitro compounds from the reaction product obtained by oxidation of a fatty acid with nitric acid, and supplements the procedure outlined in discussing the object of the invention. In the example, red oil was used as the starting material. The aqueous reaction product was concentrated and crystallized therefrom. The monocarboxylic acids formed included compounds containing four to 10 carbon atoms and these were substantially entirely retained in the mother liquor. The crystalline product comprised dicarboxylic acids containing 8 to 10 carbon atoms. The dicarboxylic and monocarboxylic acids remaining in the liquid phase were esterified with isoctyl alcohol. The esters analyzed 0.37 nitrogen. After washing with a 25 percent solution of sodium hydroxide at 50° centigrade, the aqueous and ester layers were separated and the ester layer was washed with water until free of caustic. The resulting ester analyzed only 0.1 percent nitrogen. The remaining nitrogen-containing esters are stable and are not harmful in any subsequent applications thereof such as trans-esterification, distillation, ultimate use as plasticizers, or otherwise.

In another example, the nitric acid oxidation product of fatty acid from the same source as the foregoing example was separated from the immiscible unreacted fatty acid, concentrated to separate the less water-soluble carboxylic acids. The mother liquor was esterified with methyl alcohol and the ester thus obtained was analyzed and found to contain 0.94 percent nitrogen. After treatment with 5 percent solution of sodium hydroxide at 50° C. and processing in the same way as given in Example I, the nitrogen content analyzed 0.50 percent. As before, the remaining nitrogen compounds remaining in the esters were not objectionable.

In the oxidation of hydrocarbons, nitro compounds may be formed which do not contain carboxylic groups. Any such nitro derivatives present in the ester derived from the carboxylated material will be similarly converted to salts of the alkali metal and separated in the aqueous phase.

Although caustic soda has been used in the foregoing examples, other alkali metal bases may be employed such as lithium or potassium hydroxide or a lithium, potassium or sodium carbonate or bicarbonate, providing the alkalinity of the solution is strong enough to react with the nitro-group. Ordinarily the alkaline material will be employed in aqueous soltuion. Care must be taken to prevent saponification of the ester which may occur at elevated temperatures.

Instead of removing the alkali metal derivative of the nitrogen compound as previously described, it may be advantageous, particularly where it is the sodium derivative of a long chain compound which has a higher solubility in the ester layer, to treat with acid such as sulfuric acid and convert the sodium salt and the nitro compound to a ketone which is stable and is not harmful in subsequent applications, according to the following general type formula, where $X=H$ or an alkyl group.

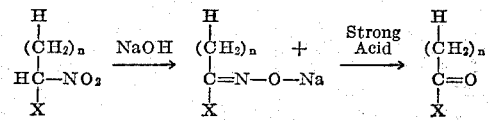

The ketone is relatively stable and is usually not harmful in subsequent applications. The aldehyde may also remain but is preferably removed by conventional methods such as distillation or precipitation with carbonyl reagents; or it may be converted to the acid and washed out with a caustic solution.

The invention is not limited to the foregoing examples, but is defined in the claims which follow.

What I claim is:

1. The improvement in the process of treating the oxidation product of a starting material which contains at least 4 carbon atoms in a saturated chain and is of the class consisting of saturated and unsaturated, cyclic and acyclic, aliphatic hydrocarbons and oxygenated derivatives thereof, with the production of a carboxylic acid which has at least 4 carbon atoms in a saturated chain and contains nitro impurity from the class in which a nitro group is connected to a primary carbon atom of the carboxylic acid and in which a nitro group is connected to a secondary carbon atom of the carboxylic acid, the oxidizing agent being at least partially of the class consisting of nitric acid, nitrous acid and oxides of nitrogen greater than $N_2O$, which improvement comprises esterifying carboxylic acid thus formed with the nitro impurity therein by reaction with an alcohol and producing water-insoluble ester, treating the ester and the portion of said nitro compound which is dissolved therein, with aqueous alkali metal base of the class consisting of lithium, sodium and potassium hydroxides, carbonates and bicarbonates, and thus producing an alkali metal derivative of the nitro compound which in aqueous solution is immiscible with the ester.

2. The improvement of the foregoing claim in which the alkali metal derivative of the nitro impurity is separated from the ester by separation of an aqueous solution thereof.

3. The improvement in the process of producing carboxylic acid esters from a fatty acid which contains at least 4 carbon atoms in a saturated chain, by oxidizing the fatty acid by nitric acid and producing carboxylic acid and as an objectionable by-product a nitro compound of carboxylic acid of the class in which a nitro group is connected to a primary carbon atom of the carboxylic acid and in which a nitro group is connected to a secondary carbon atom of the carboxylic acid, the improvement which comprises esterifying the carboxylic acid containing the nitro compound by reaction with an alkanol and producing water-insoluble ester, and converting the nitro compound to an alkali metal derivative by treatment of the ester product with an aqueous solution of alkali metal base of the class consisting of the lithium, sodium and potassium hydroxides, carbonates and bicarbonates.

4. The improvement of the foregoing claim in which the alkali metal derivative of the nitro compound is separated from the ester by solution of the former into an aqueous solution and separation of the resulting aqueous solution thereof from the ester.

5. The improvement in the process of treating the oxidation product of a starting material of the class consisting of saturated and unsaturated cyclic and acyclic aliphatic hydrocarbons and oxygenated derivatives thereof which contains at least 4 adjacent carbon atoms in a saturated chain, with the production of a carboxylic acid an alkyl ester of which is relatively insoluble in water, which acid contains nitro impurity from the class of compounds in which a nitro group is connected to a primary carbon atom and compounds in which a nitro group is connected to a secondary carbon atom, which nitro impurity is at least partially soluble in the ester and after being subjected to esterifying conditions with the carboxylic acid is capable of forming a water-soluble alkali metal derivative, the oxidizing agent being at least partially of the class consisting of nitric acid, nitrous acid and oxides of nitrogen greater than $N_2O$, which improvement comprises esterifying carboxylic acid thus formed with an alkanol and producing such ester with the impurity therein, treating the ester and dissolved impurity with alkali metal base of the class consisting of lithium, sodium and potassium hydroxides, carbonates and bicarbonates, and thus producing a water-soluble alkali metal derivative of the impurity, and then producing an aqueous solution of the impurity and separating it from the ester.

References Cited in the file of this patent

UNITED STATES PATENTS

| | | |
|---|---|---|
| 2,293,782 | Waldron et al. | Aug. 25, 1942 |
| 2,824,122 | Kuceski | Feb. 18, 1958 |

OTHER REFERENCES

Richter: "Organic Chemistry," 3rd edition, copyright 1952, pages 233 and 234. (Copy in Sci. Library.)

UNITED STATES PATENT OFFICE
CERTIFICATE OF CORRECTION

Patent No. 3,021,348 February 13, 1962

Vincent P. Kuceski

It is hereby certified that error appears in the above numbered patent requiring correction and that the said Letters Patent should read as corrected below.

Column 3, line 18, strike out "therefrom"; line 25, after "esters" insert -- obtained --; line 37, before "concentrated" insert -- and --; same column, line 58, for "soltuion" read -- solution --.

Signed and sealed this 12th day of June 1962.

(SEAL)
Attest:

ERNEST W. SWIDER
Attesting Officer

DAVID L. LADD
Commissioner of Patents